US012592065B2

(12) United States Patent
Chan et al.

(10) Patent No.: US 12,592,065 B2
(45) Date of Patent: Mar. 31, 2026

(54) SYSTEMS AND METHODS FOR OBJECT DETECTION IN EXTREME LOW-LIGHT CONDITIONS

(71) Applicant: Purdue Research Foundation, West Lafayette, IN (US)

(72) Inventors: Stanley H. Chan, West Lafayette, IN (US); Chengxi Li, West Lafayette, IN (US); Abhiram Gnanasambandam, West Lafayette, IN (US); Xiangyu Qu, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 572 days.

(21) Appl. No.: 18/045,716

(22) Filed: Oct. 11, 2022

(65) Prior Publication Data

US 2023/0298330 A1     Sep. 21, 2023

Related U.S. Application Data

(60) Provisional application No. 63/262,351, filed on Oct. 10, 2021.

(51) Int. Cl.
| | |
|---|---|
| *G06V 10/778* | (2022.01) |
| *G06V 10/77* | (2022.01) |
| *G06V 10/776* | (2022.01) |

(52) U.S. Cl.
CPC ...... *G06V 10/7784* (2022.01); *G06V 10/7715* (2022.01); *G06V 10/776* (2022.01)

(58) Field of Classification Search
CPC ........... G06V 10/7784; G06V 10/7715; G06V 10/776; G06V 10/778; G06V 10/77; G06V 10/62; G06V 10/00–98; G06V 20/00
See application file for complete search history.

(56) References Cited

U.S. PATENT DOCUMENTS

2022/0164933 A1 *   5/2022   Parameswaran .......... G06T 5/50

FOREIGN PATENT DOCUMENTS

| CN | 111242870 A | * | 6/2020 | .............. G06T 5/00 |
| CN | 113052768 A | * | 6/2021 | .............. G06N 3/08 |

OTHER PUBLICATIONS

Purwanto, D., Renanda Adhi Pramono, R., Chen, Y. T., & Fang, W. H. (2019). Extreme low resolution action recognition with spatial-temporal multi-head self-attention and knowledge distillation. In Proceedings of the IEEE/CVF International Conference on Computer Vision Workshops (pp. 0-0). (Year: 2019).*

(Continued)

*Primary Examiner* — Utpal D Shah
*Assistant Examiner* — Jack Peter Kraynak

(57)                ABSTRACT

Systems and methods for detecting objects in photon-limited environments is disclosed for use in, for example, security, defense, life science, autonomous vehicles, and various consumer and medical applications. At least one embodiment integrates a non-local feature aggregation method and a knowledge distillation method with state-of-the-art detector networks. The two methods offer better feature representations for photon limited images. In comparison with baseline systems, detectors according to embodiments of the present disclosure demonstrate superior performance in synthetic and real environments. When embodiments are applied to the latest photon counting devices, object detection can be achieved at a photon level of 1 photon per pixel or lower, significantly surpassing the capabilities of existing CMOS image sensors and algorithms.

20 Claims, 9 Drawing Sheets

(56) References Cited

OTHER PUBLICATIONS

Chen, C., Chen, Q., Do, M.N., & Koltun, V. (2019). Seeing Motion in the Dark. 2019 IEEE/CVF International Conference on Computer Vision (ICCV), 3184-3193. (Year: 2019).*

Wang, W., Chen, X., Yang, C., Li, X., Hu, X., & Yue, T. (2019). Enhancing low light videos by exploring high sensitivity camera noise. In Proceedings of the IEEE/CVF International Conference on Computer Vision (pp. 4111-4119). (Year: 2019).*

Lore, K.G., Akintayo, A., Sarkar, S.: LLNet: a deep autoencoder approach to natural low-light image enhancement. Pattern Recogn. 61, 650-662 (2017) (Year: 2017).*

Yukihiro Sasagawa and Hajime Nagahara. Yolo in the dark—domain adaptation method for merging multiple models. In Proceedings of the European Conference on Computer Vision (ECCV), pp. 345-359, 2020. 2, 3 (Year: 2020).*

Yihen Chi, et al; "Dynamic Low-Light Imaging with Quanta Image Sensors", Published by Springer; Nov. 20, 2020; 17 pages.

Samira Ebrahimi, et al; "Stable and simple quantitative phase-contrast imaging by Fresnel biprism", Applied Physics Letters 112; Published online Mar. 15, 2018; 5 pages.

Markus Finkeldey, et al; "Depth-filtering in common-path digital holographic microscopy", Optics Express; vol. 25, No. 16; Aug. 7, 2017; 10 pages.

Abhiram Gnanasambandam, et al; "Image Classification in the Dark Using Quanta Image Sensors", Published by Springer; Nov. 20, 2020; 18 pages.

Chengxi Li, et al; "Photon-Limited Object Detection using Non-local Feature Matching and Knowledge Distillation", Published Nov. 21, 2021, IEEE/CVF International Conference on Computer Vision Workshops: 12 pages.

Xiaolong Wang, et al; "Non-local Neural Networks", Computer Vision Foundation, Dec. 18, 2018; 10 pages.

* cited by examiner (b) Comparison with image denoisers.

SYSTEMS AND METHODS FOR OBJECT DETECTION IN EXTREME LOW-LIGHT CONDITIONS

This application claims the benefit of U.S. Provisional Application No. 63/262,351, filed Oct. 10, 2021, the entirety of which is hereby incorporated herein by reference.

GOVERNMENT RIGHTS

This invention was made with government support under 1718007 CCF awarded by the National Science Foundation. The government has certain rights in the invention.

FIELD

Embodiments of the present disclosure relate generally to image detections and/or acquisition under conditions where the number of measured photons is very low, otherwise known as photon-limited imaging.

BACKGROUND

Object detection under photon-limited conditions, which in certain applications is also referred to as extreme low light conditions, is useful in many applications, such as night vision, surveillance in an under-resourced environment, and microscopy with limited fluorescence dosage and cell exposures. In these conditions the number of photons per pixel is low due to a dark environment and/or a short integration time. While existing "low-light" image enhancement methods have improved image contrast between foreground and background through, for example, advanced coloring techniques, the inventors of the present disclosure have realized that deficiencies exist with, for example, a more challenging problem of mitigating the photon shot noise, such as shot noise inherited from the random Poisson process.

Despite there being existing techniques for image processing including the usage of deep neural networks, the inventors of the present disclosure realized that the networks and training of these existing techniques (e.g., deep neural networks) are not designed for photon-limited conditions. As a result, directly applying existing techniques to photon-limited conditions is ineffective (performance is limited even if one augment training data) and inefficient (pre-processing could be computationally expensive but does not necessarily lead to unparalleled performance).

One limit in object detection in photon-limited conditions identified by the inventors of the present disclosure is attributed to the random Poisson process of the photon arrivals. This randomness is present even when assuming a perfect sensor, in other words, a sensor where there is no read noise, no dark current, and a uniform pixel response. Due to the randomness, the inventors realized that a photon-limited object detection algorithm should be able to extract a weak signal from the background noise. And, while existing low-light enhancement algorithms have shown promise in this area, the inventors have realized that improvements are needed in detecting images that not only have a low contrast but are also contaminated with shot noise.

Existing methods perform a two-stage task by first recoloring the image to improve the image contrast, and then run a standard object detection method. However, the inventors realized that the methods only work when the amount of noise is small to moderate and fail when the noise is strong.

Certain preferred features of the present disclosure address these and other needs and provide other important advantages.

SUMMARY

Embodiments of the present disclosure provide improved systems and methods for object detection in extreme low-light conditions and/or solve the problem of detecting objects in the presence of very heavy noise due to a dark environment.

Some embodiments include a network architecture with convolutional neural network and a non-local module, and/or a student-teacher training scheme for training the network.

Embodiments of the present disclosure include photon-limited object detection frameworks that utilize one or both of the following methodologies: 1) a space-time non-local module that leverages the spatial-temporal information across an image sequence in the feature space, and 2) a knowledge distillation training scheme in the form of student-teacher learning to improve the robustness of the detector's feature extractor against noise. Some embodiments use one or both of these methodologies with existing object detectors, including the latest state-of-the-art object detectors. Experiments demonstrated improved performance of the proposed method in comparison with state-of-the-art baselines. For example, in one embodiment where the two methodologies were integrated with state-of-the-art photon counting devices, the algorithm achieved more than 50% mean average precision at a photon level of 1 photon per pixel.

Embodiments provide a way to do object detection without requiring post-processing on the raw image data in the presence of noise. However, when combined with image enhancement methods for post-processing of the images, embodiments can provide even further improvement in performance. When trained with the appropriate data, embodiments can achieve more than 10% improvement in mean Average Precision (mAP) over the existing methods in light levels as low as 1 photo per pixel.

Some embodiments include integration of the methods and systems disclosed herein into the software of a camera software module.

Embodiments also include teacher-student learning methodologies for handling noisy data in contrast to using teacher-student learning for model compression.

Further embodiments utilize a non-local module instead of performing feature projection, which has advantages in handling noisy data. Some embodiments directly use student-teacher features, while additional embodiments pick the top K features instead of computing all similarities.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
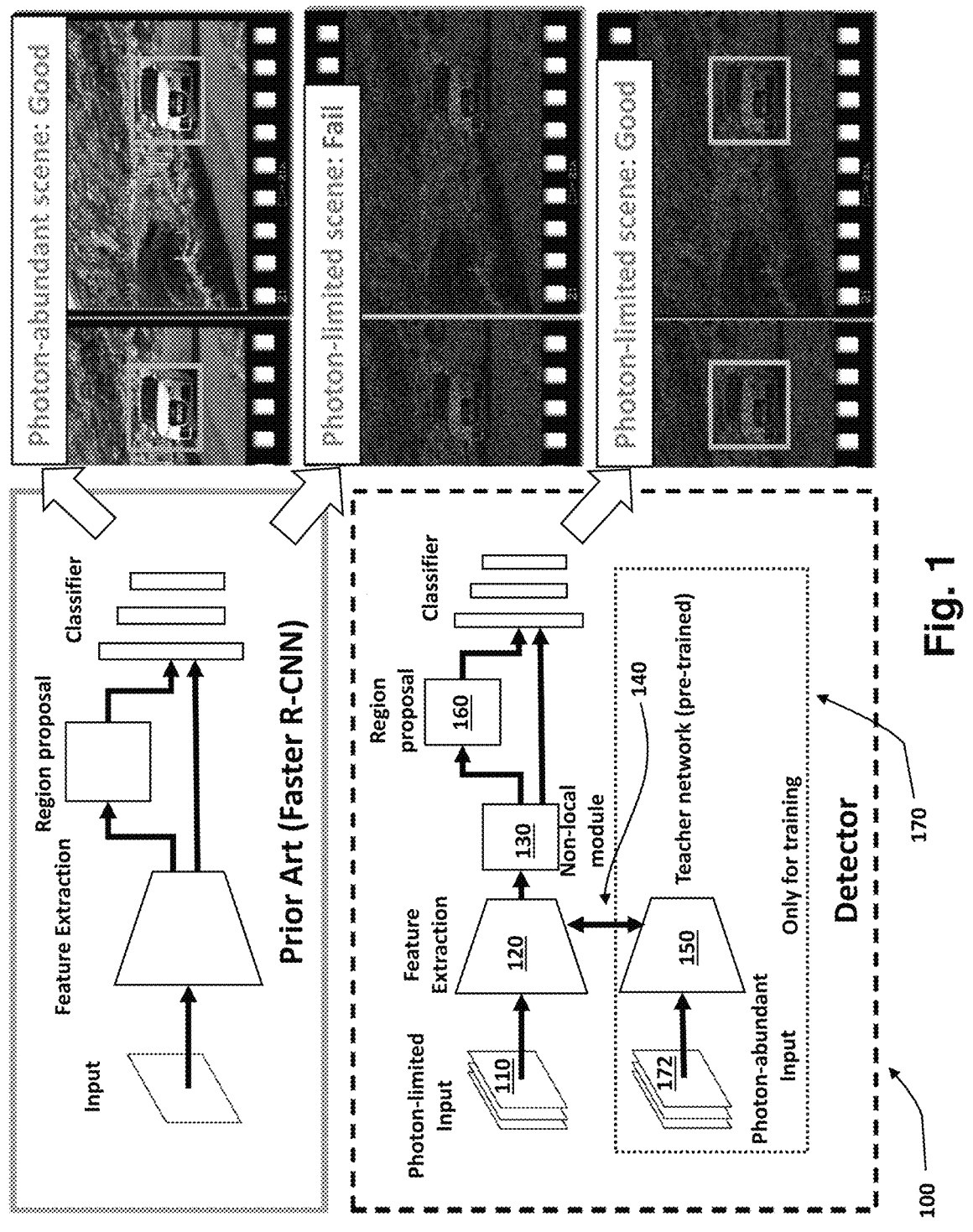
FIG. 1 depicts an object detection method and system for photon-limited conditions according to an embodiment of the present disclosure in comparison with a prior art object detection method.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussions with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include software for very low-light object detection. When light levels are extremely low or exposure time is extremely short, each pixel in an imaging system receives only a handful of photons (for example, less than 50 photons per pixel on average). Images captured under this condition tend to be dominated by photon shot noise. To improve the performance of existing devices and methods, a spatial-temporal non-local module according to embodiments of the present disclosure may be introduced to leverage the information from neighbor frames and/or a student-teacher knowledge distillation technique according to further embodiments may be introduced to train the student network with an initially identical structure to a pre-trained teacher network to recognize images in a noise intensive environment.

In some embodiments the input to the software is a single-frame color image or a stack of multiple-frame color images captured at a very low-light and noisy condition. The software produces an output that locates objects by generating a bounding box around the objects and reporting the object classes.

Embodiments of the software include one or both of the following aspects: (1) the image features extracted by the software are generated by a new protocol called the student-teacher learning scheme that alleviates the noise corruption seen in the image features, and (2) the K-nearest neighbor non-local search module extracts and compares similar image features in the space-time data volume. Further embodiments integrate these two aspects with region proposal deep neural networks 160 to produce the object labels 170.

An example system according to one embodiment of the present disclosure is depicted in FIG. 1. Conventional methods, such as Faster R-CNN, may detect objects from photon-abundant image data (represented by the object box in the top images on the right side of FIG. 1); however, conventional methods fail to detect objects under photon-limited conditions (represented by the absence of an object box in the middle images on the right side of FIG. 1). Example systems of the present disclosure overcome the difficulties with photon-limited images by leveraging spatial-temporal redundancy and/or regularizing features via a student-teacher knowledge distillation (represented by the presence of an object box in the bottom images on the right side of FIG. 1).

Systems and methods for detecting objects in low photon (extreme low light) conditions according to embodiments of the present disclosure is depicted in FIG. 1. System 100 according to embodiments of the present disclosure leverages spatial-temporal redundancy is depicted in FIG. 1. System 100 utilizes input frames (for example, a burst of photon-limited frames 110) as input data into a feature extraction module 120, which generates a feature map for each of the images of the input data. Although motion will typically exist across the frames 110, the total signal-to-noise ratio (SNR) of the burst can be higher than that of a single frame. Next, the data can be directly input into a non-local module (for example, a space-time nonlocal feature aggregation module 130) to assemble neighboring space-time features, or can have its features regularized by a student-teacher knowledge distillation module 140, where the feature extraction module 120 (the student network) is trained to mimic the features produced by a pre-trained teacher 150 to maximize the SNR of the features. After the student-teacher knowledge distillation module 140, the data can be input into a non-location module (such as the space-time nonlocal feature aggregation module 130) to assemble the neighboring space-time features. After these optional operations, the data is input into a region proposal 160 and then to a classifier.

Some embodiments incorporate one or more of the above two methodologies (the non-local feature module 130 and the knowledge distillation technique 140) into existing systems and methods, such as Faster R-CNN, resulting in improved detection performance. For example, experimental results have shown that new algorithms according to embodiments of the present disclosure outperform baseline algorithms by more than 6% in mean accuracy precision (mAP). Given a desired mAP level, embodiments require up to 50% fewer photons, and when combined with current single-photon image sensors, embodiments achieve object detection at 1 photon per pixels (PPP) or lower on real images.

Example Methodology

Given a sequence of photon-limited frames 110 (for example, each frame having 0.25 photons per pixel (ppp) or less), embodiments of the present disclosure localize objects and identify their classes in ALL frames. At least some of the embodiments are trained on data obtained from images (which may be obtained from, for example, the Image Formation Module 170 addressed below) and can include a non-local module 130 (for example, as described in the Non-Local Feature Matching (Space Time Non-Local Module) example discussion below) and/or a student-teacher learning module 140 (for example, as described in the Knowledge Distillation section below).

Image Formation Module

The image formation module 170 takes one or more photon abundant images 172 and simulates one or more corresponding photon-limited images for training the teacher network 150. A signal, x, that is generated by an image sensor in photon-limited conditions can be modeled through a Poisson process, which is represented by Equation (1), where CFA is the color filter array; $y_{RGB}$ is the clean RGB image in the range [0; 1]; $\alpha$ is the average number of photons arriving at the sensor (and therefore depends on the exposure time and the average photon flux of the scene); $\eta_{dc}$ is the dark current; and $\eta_r \sim N(0, \sigma_r I)$ is the readout noise with standard deviation $\sigma_r$. Using Equation 1 the photon abundant (high quality) image data 172 is manipulated to generate an image data set that simulates a photon-limited (low quality) image. Once the simulated photon-limited image is generated, two different representations of the same image exist: a photon abundant image (the "truth" image) and the corresponding (simulated) photon-limited (low quality) image.

$$x = \text{Poisson}(\alpha \cdot \text{CFA}(y_{RGB}) + \eta_{dc}) + \eta_r \qquad \text{Equation (1)}$$

The final output x of the image generation process is truncated at, for example, 3 standard deviation from mean pixel values and re-normalized to the range [0,1]. All frames can be assumed to be statistically independent, as the Poisson process and the noise are independent. The values listed in Table 1 may be used for the parameters in Equation 1; however, the methods and systems are not limited to this set of parameters and other embodiments utilize different sets of parameters to produce the synthesized image data. For example, in some embodiments $\alpha > 0$, while in other embodiment $\alpha > 0.25$. As another example, the lower bound for $\sigma_r$ in some embodiments is 0.25 (which can be useful for the most up to date sensors, e.g., QIS), while the lower bound for $\sigma_r$ in some additional embodiments is 2.0 (which can be useful with conventional CMOS cameras). For modern sensors with short exposure time, the dark current parameter $\eta_{dc}$ is assumed to be insignificant compared to other noise sources and set to 0, although with older sensors it can be set to higher values (for example, 0.026).

TABLE 1

| Data Synthesis Parameters | |
|---|---|
| PARAMETER | VALUE(S) |
| $\alpha$ | 0.25-5 |
| $\eta_{dc}$ | 0 |
| $\sigma_r$ | 0.25 or 2.0 |

Non-Local Module

The non-local module 130 performs non-local feature matching, one example of which is space time non-local feature mapping.

A significant challenge in detecting objects under photon-limited conditions is the presence of intense shot noise. Embodiments of the present disclosure extract signals from the noise utilizing the spatial-temporal redundancy across a burst of frames. For example, after finding similar patches in the space-time volume, a non-local average is taken to boost the signal.

One of the difficulties with leveraging multiple frames of images is that objects move from frame to frame making them difficult to track. Non-local algorithms according to embodiments of the present disclosure can be used to address this issue. One aspect of embodiments of the present disclosure is that the algorithms do not address the image space, but instead address the feature space of the multiple frames. In an example where the image space and the feature space have the same number of pixels, each pixel in the image space contains information related to three colors (red, blue and green) while each pixel in the feature space contains more information related to how the pixel exists as part of a larger neighborhood, for example, whether the pixel is part of the background, part of a car, part of an edge portion of a car, part of a person, etc.

Figure 2:
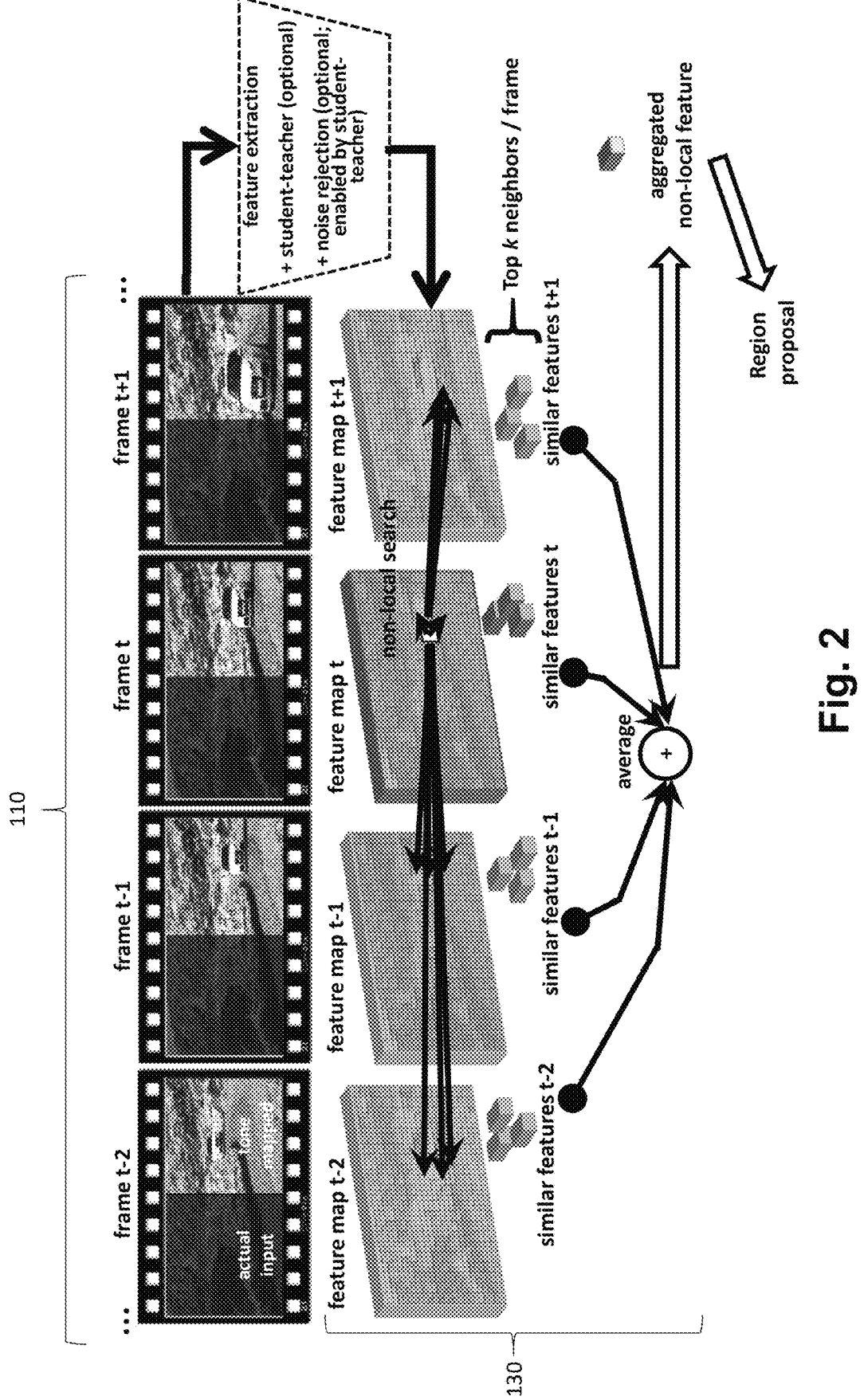
FIG. 2 depicts a non-local module and student-teacher training scheme. The teacher network is first pre-trained on photon-abundant data and it enforces the student to extract noise-rejected features of each input frame. By applying the non-local search in the feature space, similar spatial-temporal features are aggregated to update the key frame features.

One embodiment of a non-local module 130 that performs these actions is depicted in FIG. 2. Here, each frame of an image sequence 110 is input into a feature extractor 120 (for example, a student-teacher module as discussed in the Student-Teacher Knowledge Distillation discussion below) to obtain a feature map for each of the images. For each feature vector at location (i; j; t), where i and j represent the x and y locations of the feature vector on each frame and t represents frame t (which may be correlated to time t), a non-local search for similar features is conducted by computing the inner-products of each feature vector and all the candidate feature vectors in the adjacent frames. A feature vector is a vector containing multiple elements (features). The features may represent, for example, a pixel or a whole object in an image. Examples of features that may be represented in a feature vector include color components, length, area, circularity, gradient magnitude, gradient direction and/or gray-level intensity value.

The inner product of two vectors of equal length is given by the sum of the products of the coordinates with same index, such as taking the inner product of two vectors u=[1,2,3,4] and v=[5,6,7,8] results in the inner product being equal to (1×5)+(2×6)+(3×7)+(4×8). This operation produces a set of scalars representing the similarities between the current feature and the features in the space-time neighborhood. Then, for every time t, the top-k feature vector candidates with the highest inner product values are selected. In at least one embodiment, k=2, which appears to be an acceptable value for many cases. However, in other embodiments k can be a different value, for example, 1, 3, 4, or higher. After picking the top-k features, the average is taken to generate an aggregated non-local feature.

Embodiments of the space-time non-local module 130 differ from traditional non-local neural networks in one or more of the following ways.

First, before computing the similarity, some traditional non-local neural networks use additional processing, such as to use convolutional layers to first project features onto another feature space, which is designed to represent high-level semantic meanings of the scene, such as interactions. For photon-limited imaging where the SNR is low, this additional processing results in features (e.g., semantic-level features) that are generally more corrupted and are therefore less reliable than low-level features. By using only the feature extraction portion from a backbone extractor and not using the additional processing, the results as achieved by embodiments of the present disclosure are less corrupted by noise. In some embodiments, the image is kept the same before taking the inner product.

Second, some traditional non-local neural networks aggregate all space-time information, such as by using a softmax or similar weighted average. However, embodiments of the present disclosure average less than all of the space-time information, thereby simplifying the number of features. For example, at least one embodiment selects only a few of the best space-time information features (the top-k features where k, for example, equals 4 in some embodiments and 2 in further embodiments), and in some embodiments selects the single best space-time information feature, which helps embodiments of the present disclosure avoid being distracted by irrelevant features in the time-space.

Using these methodologies the computational expense is reduced compared with existing methodologies. And, while existing methodologies may be quite capable of recognizing features in well illuminated environments (albeit with additional computational expense), the existing methodologies have great difficulty recognizing features in extremely low light environments with high shot noise while still carrying the additional computational expense. In one manner of explanation, the existing methodologies with their greater computation expense confuse the network being trained when used in extremely low illumination environments with high shot noise. Because embodiments of the present disclosure use simplified methodologies with fewer layers, more of the original image information is preserved and computational expense is reduced. However, by keeping more of the image information, more of the shot noise is also kept. To compensate for this and limit the noise, embodiments pick only the top few results (the "top-k" feature candidates), and in some embodiments pick the single top result, for continued processing in order to separate the noise. The more results that are picked, the more noise will be also be picked and the more influence the noise will have, so limiting the results that are picked reduces the noise.

Student-Teacher Knowledge Distillation

Performance of the non-local feature matching depends on the signal-to-noise ratio (SNR) of the features. If the features are contaminated by significant noise, finding correct feature correspondence can be difficult. To address this issue some embodiments utilize a knowledge distillation process referred to as a student-teacher learning scheme 140 to regularize the features. A student feature extractor 120 is trained by minimizing a measurable distance (for example, the $L_2$ distance) of its feature with the features from a teacher that has been pre-trained on clean data so that the features extracted by the student are denoised, i.e., noise is reduced, if not eliminated, from the student.

Embodiments of the present disclosure include student-teacher training methodologies where features are learned in noisy environment where existing training schemes are not effective. The training schemes used in various embodiments provide new ways of generating weights of neural networks and result in improved sets of neural network weights that have particular benefits with noisy images.

For comparison purposes, a type of existing network training is end-to-end type supervised training, which does not utilize the concept of teacher or student networks. For example, in end-to-end training the predicted results (which can be referred to as "output") are produced based on the noisy input, and they are further compared with a "ground-truth," and the differences between the predicted results and ground-truth are minimized during training.

Another type of existing network training uses a type of teacher-student training to compress a network. The teacher network "teaches" a student network to make the same prediction, where the student has fewer network parameters.

In contrast to the existing types of network training, embodiments of the present disclosure use a methodology where the teacher network architecture and the student network architecture are exactly the same during training and the student network is gradually trained by gradually increasing the relative emphasis of the student network parameters (e.g., changing the weights) without changing the architecture of the student network and by slowly giving "hints" to the student network. Here, clean data is sent to a teacher network branch while noisy data is sent to a parallel student network branch. The feature extractor in each branch extracts feature results, and the feature results of each branch are compared with the differences being referred to as "perceptual loss," which may be thought of as an error score. The results of the teacher and student branches are compared and the differences are used to update the weights and parameters of the student network. The magnitude of the perceptual loss will inform how much influence the teacher will give to the student. If the perceptual loss is high, then the training will spend more effort adjusting the student network's parameters in order to bring the perceptual loss down. If the perceptual loss is low, then the magnitude of the adjustment will smaller.

Comparison occurs between every pair of noisy and clean data. With the teacher network unchanged and the student network modified (the weights in the student network being modified), the process is repeated with the clean data being sent to the teacher network branch while the noisy data is sent to the student network branch. The new results are compared, and the differences are used to again modify the weights in the student network architecture. Again, the network architecture of the teacher and student branches are the same. As the process repeats, the student branch network keeps changing its parameters (which may also be referred to as "weights"). This process terminates when either a predetermined maximum number of training steps is reached or the training loss is lower than a predetermined certain level. In other words, when either a predetermined number of iterative training steps is reached or the difference in results between the teacher (clean data) and student (noisy data) branches are sufficiently small, the student network is considered to be sufficiently trained and the student network with its modified parameters (weights) is used to analyze new sets of noisy data, i.e., new sets of photon-limited input 110.

Figure 3:
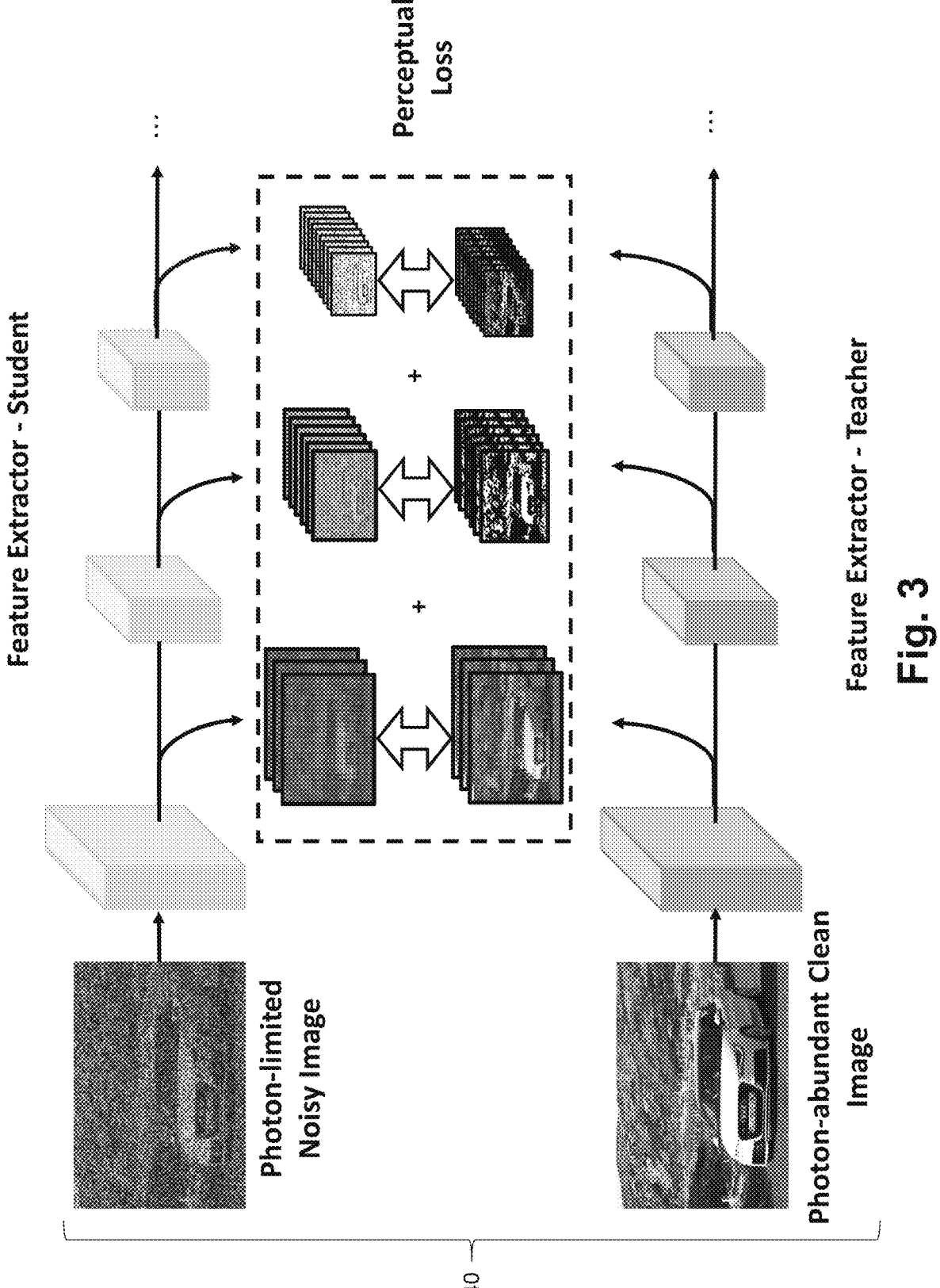
FIG. 3 depicts a knowledge distillation via student-teacher learning methodology according to one embodiment of the present disclosure. The teacher network is pre-trained on clean images and the student network is trained by minimizing the perceptual loss which measures the pixelwise difference of the features.

FIG. 3 depicts one embodiment of the student-teacher learning module 140. In FIG. 3 there is a teacher network 150 and a student network, which is the feature extraction module 120 when the student-teacher module 140 is utilized. However, as addressed herein, the feature extraction module 120 is used without the student-teacher module 140 in some embodiments. The teacher network 150 is pre-trained using well-illuminated images 172. The student network 120 has the same architecture but it is used to extract features from the noisy photon-limited data. In the training stage, the parameters of the teacher network 150 are fixed and those of the student network 120 are trainable. Because the teacher network 150 is trained to handle clean images 172, it generates noise-free features when it is fed with clean images 172. The goal is to have the features produced by the student network 120 to be similar to those of the teacher 150. To achieve this goal, embodiments introduce regularization to the student network 120 by defining a perceptual loss as $\mathcal{L}_p$ in Equation (2), where $\hat{\phi}_i(x_{clean})$ and $\phi_i(x_{noisy})$ are the i-th layer's feature of the teacher and student network, respectively. The perceptual loss $\mathcal{L}_p$ is the Euclidean distance measuring the difference between the student's and the teacher's features. Minimizing the perceptual loss (i.e., differences between the results of the teacher network and the student network) forces them to be close in the feature space. This further enforces the network to denoise the image and generate good representations before non-local feature matching.

$$\mathcal{L}_p = \sum_{i=1}^{N} \left\| \hat{\phi}_i(x_{clean}) - \phi_i(x_{noisy}) \right\|^2, \qquad \text{Equation (2)}$$

The overall training loss of detectors according to at least some embodiments include the perceptual loss $\mathcal{L}_p$, the standard cross-entropy loss, and the regression loss.

Once the student network 120 is trained and ready for use, embodiments of the present disclosure implement the trained student network 120 as the feature extractor in the systems and methods described above in the Non-Local Feature Matching (Space Time Non-Local Module) section.

Benefits

Figure 4:
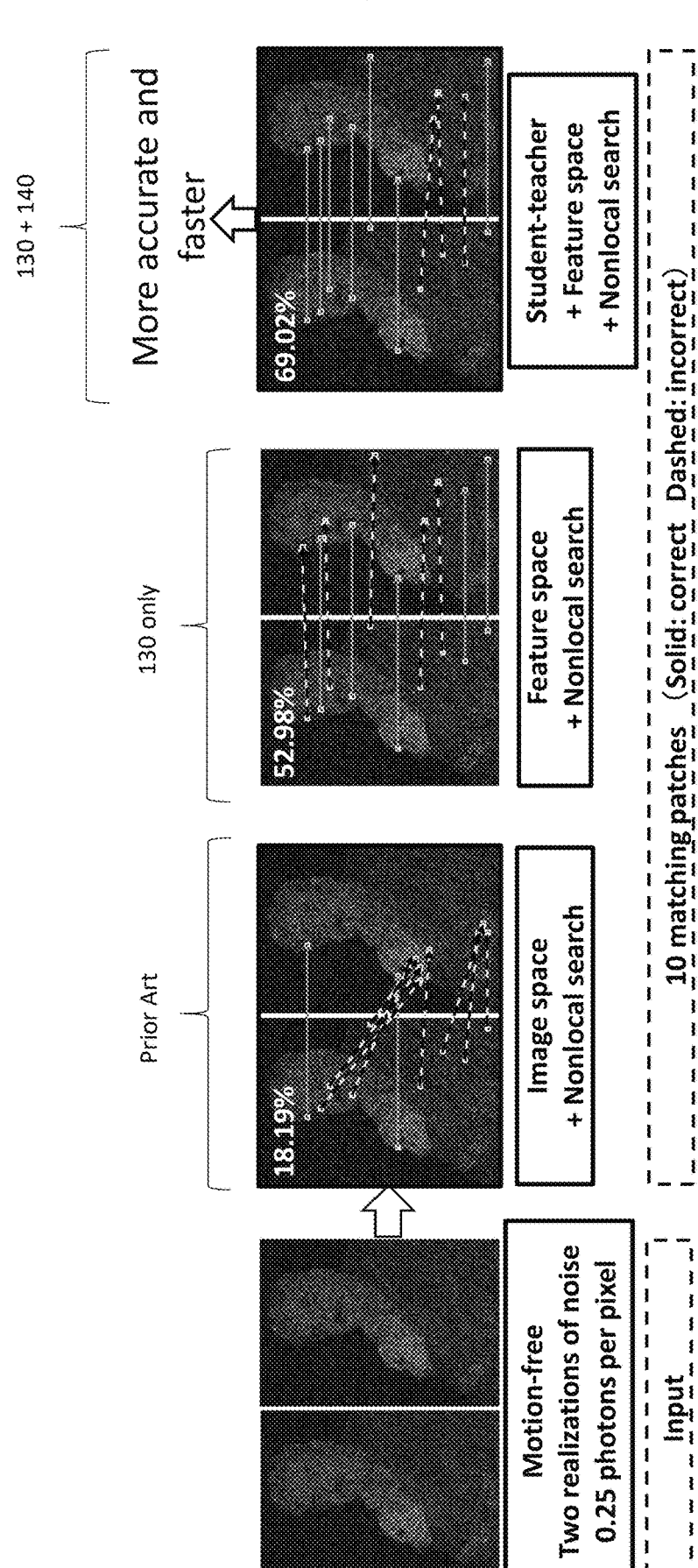
FIG. 4 depicts a comparison of different non-local patch matching methods. Here, two i.i.d. copies of a photon-limited image are synthesized. For each competing configuration, 10 matching patch examples are visualized. The blue and yellow arrows indicate correct and incorrect matching, respectively. As the image pair is motion-free, the correct matches should be indicated by horizontal arrows. The combination of non-local search and student-teacher learning demonstrates superior performance.

Experiments were conducted to illustrate the benefit of embodiments of the non-local module 130 and the student-teacher learning scheme 140. In FIG. 4, two independent and identically distributed (i.i.d.) copies of a photon-limited image at a photon level of 0.25 photons per pixel (ppp) were synthesized. This pair of images were used to check how the feature matching process performs. Three methods were compared: 1) non-local search in the image space (i.e., the original non-local search, depicted in FIG. 4 as "Prior art"), 2) non-local search in the feature space (depicted in FIG. 4 as "130 only"), and 3) student-teacher+non-local search in the feature space (depicted in FIG. 4 as "130+140"). In the image space, for each h×w patch, its normalized cross-correlation (NCC) was computed with all h×w patches in the other image and the one with the highest NCC was chosen as its matching patch. In the feature space, features trained with or without student-teacher training were used and correspondence for every feature vector was determined. The correspondence was visualized by the center of the receptive field of feature vectors.

Benefits can be seen in two aspects: accuracy and speed. As illustrated in FIG. 4, the non-local search in the feature space ("130 only") had a much higher success rate of finding correct correspondence than the same method applied to the image space ("Prior art"). The student-teacher training ("130+140") further increased the performance by enhancing the robustness of the feature extractor against noise. The experiment was performed for 100 images and the observed trend was consistent.

As for speed, the non-local search in the image space ("Prior art") was computationally more expensive than in the feature space ("130 only"). Given an H×W image with desired patch size h×w, the feature matching process took approximately $(HW)^2hw$ floating-point operations (FLOPs) in the image space ("Prior art") and $$\left(\frac{HW}{S}\right)^2 C$$

FLOPs in the feature space ("130 only"), where C is feature vector dimension and S is spatial resolution compression ratio by the feature extractor. Reducing the patch size reduces the computation cost, but the matching quality also deteriorates. In one example implementation, 64×64 for the image space search and it takes ~256 times more computation than in the feature space.

EXAMPLE EMBODIMENTS

Figure 5:
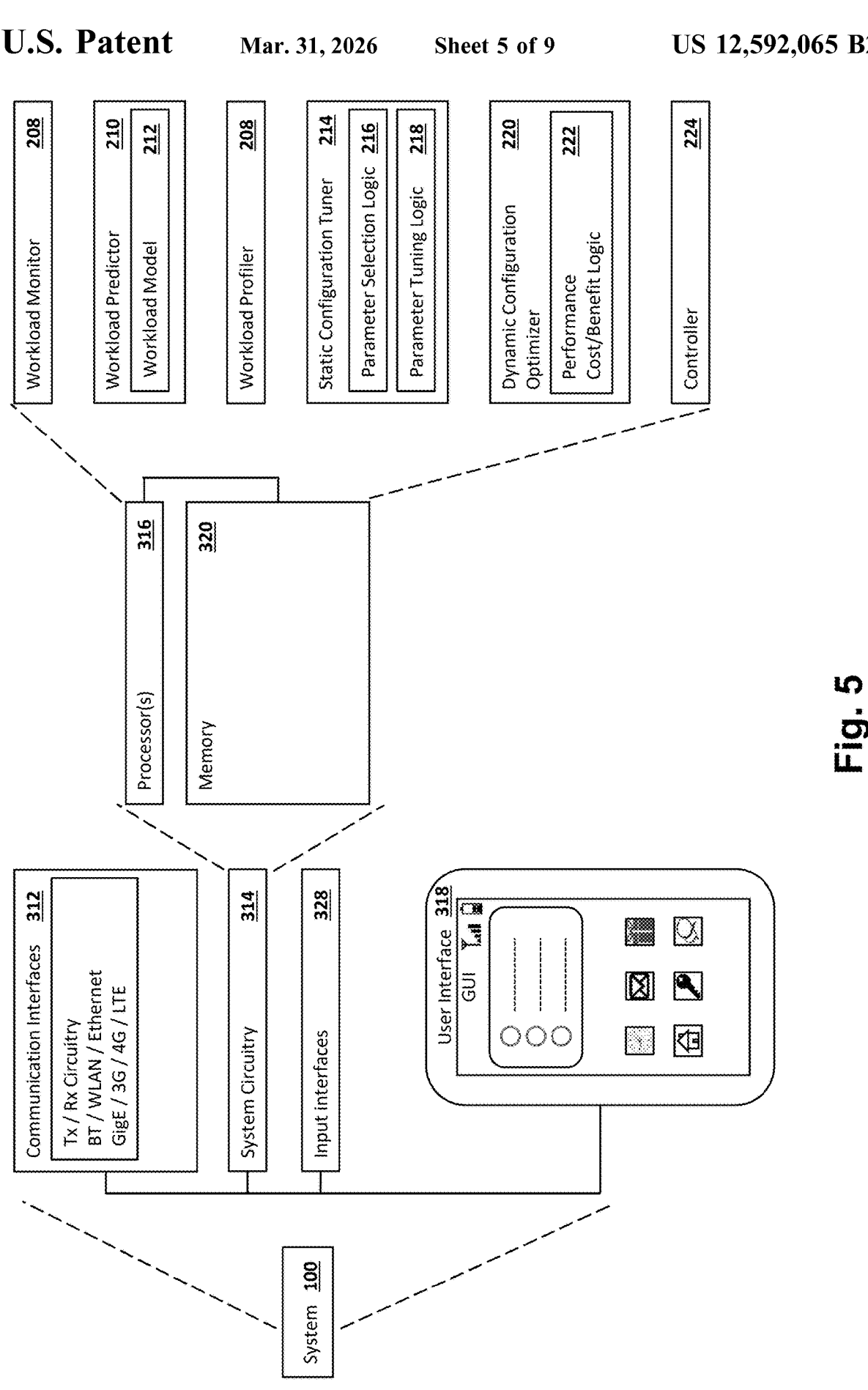
FIG. 5 depicts a system according to one embodiment of the present disclosure.

FIG. 5 illustrates an example system 100 according to at least one embodiment of the present disclosure. The system 100 is used to implement the logic and/or algorithms described in this disclosure and may include communication interfaces 312, input interfaces 328 and/or system circuitry 314. The system circuitry 314 may include one or more processors 316. Alternatively or in addition, the system circuitry 314 may include memory 320.

The processor 316 may be in communication with the memory 320. In some examples, the processor 316 may also be in communication with additional elements, such as the communication interfaces 312, the input interfaces 328, and/or the user interface 318. Examples of the one or more processors 316 may include a general processor, a central processing unit, logical CPUs/arrays, a microcontroller, a server, an application specific integrated circuit (ASIC), a digital signal processor, a field programmable gate array (FPGA), a graphics processing unit (GPU, for example, a Jetson AGX Xavier Module produced by NVIDIA©), and/or a digital circuit, analog circuit, or some combination thereof.

The processor 316 may be one or more devices operable to execute logic. The logic may include computer executable instructions or computer code stored in the memory 320 or in other memory that, when executed by the processor 316, causes the processor 316 to perform the operations of the workload monitor 208, the workload predictor 210, the workload model 212, the workload profiler 213, the static configuration tuner 214, the perimeter selection logic 216, the parameter tuning logic 218, the dynamic configuration optimizer 220, the performance cost/benefit logic 222, the controller 224, and/or the system 100. The computer code may include instructions executable with the processor 316.

The memory 320 may be any device for storing and retrieving data or any combination thereof. The memory 320 may include non-volatile and/or volatile memory, such as a random access memory (RAM), a read-only memory (ROM), an erasable programmable read-only memory (EPROM), or flash memory. Alternatively or in addition, the memory 320 may include an optical, magnetic (hard-drive) and/or solid-state drive, or any other form of data storage device. The memory 320 may include at least one of the workload monitor 208, the workload predictor 210, the workload model 212, the workload profiler 213, the static configuration tuner 214, the perimeter selection logic 216, the parameter tuning logic 218, the dynamic configuration optimizer 220, the performance cost/benefit logic 222, and/ or the system 100. Alternatively or in addition, the memory may include any other component or subcomponent of the system 100 described herein.

The user interface 318 may include any interface for displaying graphical information. The system circuitry 314 and/or the communications interface(s) 312 may communicate signals or commands to the user interface 318 that cause the user interface to display graphical information. Alternatively or in addition, the user interface 318 may be remote to the system 100 and the system circuitry 314 and/or communication interface(s) may communicate instructions, such as HTML, to the user interface to cause the user interface to display, compile, and/or render information content. In some examples, the content displayed by the user interface 318 may be interactive or responsive to user input. For example, the user interface 318 may communicate signals, messages, and/or information back to the communications interface 312 or system circuitry 314.

The system 100 may be implemented in many ways. In some examples, the system 100 may be implemented with one or more logical components. For example, the logical components of the system 100 may be hardware or a combination of hardware and software. The logical components may include the workload monitor 208, the workload predictor 210, the workload model 212, the workload profiler 213, the static configuration tuner 214, the perimeter selection logic 216, the parameter tuning logic 218, the dynamic configuration optimizer 220, the performance cost/benefit logic 222, the system 100 and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 320, for example, that comprises instructions executable with the processor 316 or other processor to implement one or more of the features of the logical components. When any one of the logical components includes the portion of the memory that comprises instructions executable with the processor 316, the component may or may not include the processor 316. In some examples, each logical component may just be the portion of the memory 320 or other physical memory that comprises instructions executable with the processor 316, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

ADDITIONAL EXAMPLE EMBODIMENTS

DATASET. In one example the procedure outlined in Image Formation Example discussion above is used to synthesize training data of the photon-limited images from the Pascal VOC 2007 dataset. (Mark Everingham, Luc Van Gool, Christopher K I Williams, John Winn, and Andrew Zisserman. The Pascal Visual Object Classes (VOC) Challenge. International Journal of Computer Vision (IJCV), 2010.) To synthesize motion across the frames, a random translation of image patches is introduced. The total movement in this example varies from 7 to 35 pixels across 8 frames. For testing, one or more synthetic testing datasets created by the inventors and/or one or more collected datasets of real images may be used. The read noise of the model may be assumed to be $0.25e^-$ for the sensor used in the example, such as discussed in Jiaju Ma, Saleh Masoodian, Dakota A Starkey, and Eric R Fossum. Photon-number-resolving Megapixel Image Sensor at Room Temperature without Avalanche Gain. Optica, 2017. The average photon level can range from 0.1 to 5.0 photons per pixel (ppp). Using, for example, an f/1.4 camera, 1.1_m pixel pitch, and 30 ms integration, this range of photons roughly translates to 0.02 lux to 5 lux (typical night vision scenarios). A GJ01611 16MP photon counting Quanta Image Sensor developed by GigaJot Technology or similar may also be used, such as for the real data set.

IMPLEMENTATION. One example is implemented in Pytorch, such as discussed in Jianwei Yang, Jiasen Lu, Dhruv Batra, and Devi Parikh. A faster pytorch implementation of faster r-cnn, 2017 (available at https://github.com/jwyang/faster-rcnn.pytorch). The framework takes a T-frame image sequence as input, and T is set to be 1, 3, 5 and 8 in the following experiments. At least one example embodiment uses ResNet-101 (for example, as discussed in Kaiming He, Xiangyu Zhang, Shaoqing Ren, and Jian Sun, Deep residual learning for image recognition, in Proceedings of the IEEE Conference on Computer Vision and Pattern Recognition (CVPR), pages 770-778, 2016) pre-trained on ImageNet (for example, as discussed in Jia Deng, Wei Dong, Richard Socher, Li-Jia Li, Kai Li, and Li Fei-Fei, Imagenet: A Large-scale Hierarchical Image Database, in Proceedings of the IEEE International Conference on Computer Vision and pattern Recognition (CVPR), 2009) as the backbone. The perceptual loss is applied to the features obtained from block_1, block_2 and block_3 of ResNet-101 and the non-local module 130 is processed on the features from block_3. RolAlign (such as discussed in Kaiming He, Georgia Gkioxari, Piotr Dollr, and Ross Girshick. Mask r-cnn. IEEE Transactions on Pattern Analysis and Machine Intelligence, 42(2):386-397, 2020) is used to extract the features from object proposals, and block_4 is further applied to the extracted proposal features before the final classifier. The model may then be trained for 20 epochs using an optimizer (for example, the Adam optimizer as discussed in Diederik P. Kingma and Jimmy Ba. Adam: A Method for Stochastic Optimization. In International Conference on Learning Representations (ICLR), 2014), which may be used with default parameters, learning rate 0.001, and/or weight decay 0.1 every 5 epochs.

COMPARISON WITH OTHER METHODS. Results using these example embodiments were compared with four baselines: (a) a generic image object detector: Faster R-CNN, fine-tuned using the photon-limited data we synthesized; (b) a video object detector: Relation Distillation Network (RDN), also fine-tuned using photon-limited data; (c) a low-light detection framework: color restoration algorithm (MSRCR) plus a detection RetinaNet; and (d) a two-stage pre-denoised detection framework: RED-Net plus Faster R-CNN.

Results

At least one experiment using an embodiment as described above was conducted on synthetic data using 8-frame inputs with the number of features for non-local aggregation set to 2 per frame in the following experiments.

Figure 6A:
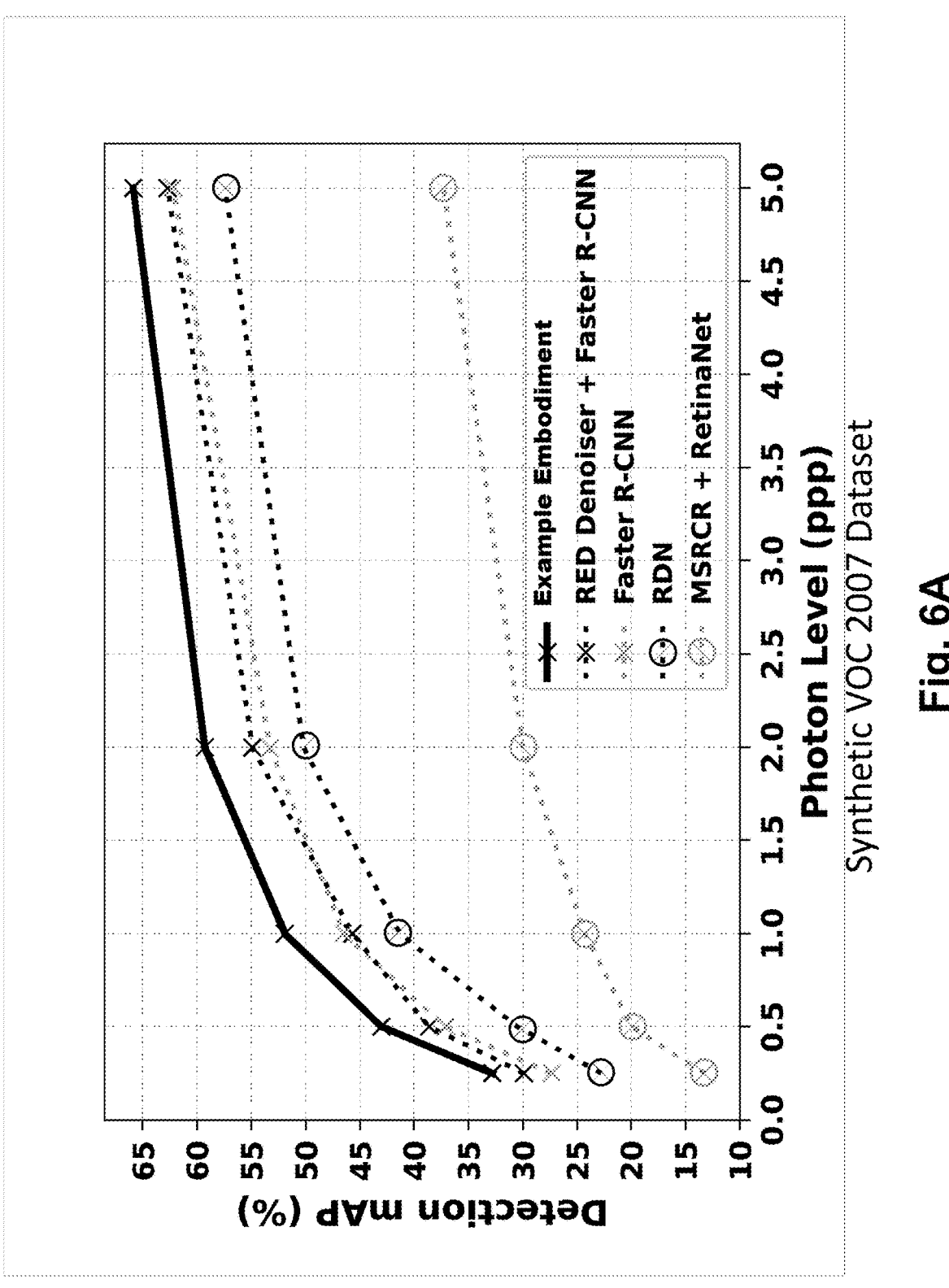
FIG. 6A depicts experimental results conducted on synthetic data comparing different object detection methods: Faster R-CNN, RED+Faster R-CNN, RDN, and MSRCR+RetinaNet.

COMPARISON WITH BASELINES. FIG. 6A shows the detection rate, measured in mean average precision (mAP), as a function of the photon level, measured in photons per pixel (ppp). The tested embodiment consistently outperformed the competing methods across the tested photon levels from 0.25 ppp to 5.0 ppp. The difference between our method and the second-best method is as large as 6% in terms of mAP when the photon level is 2.0 ppp.

Figure 6B:
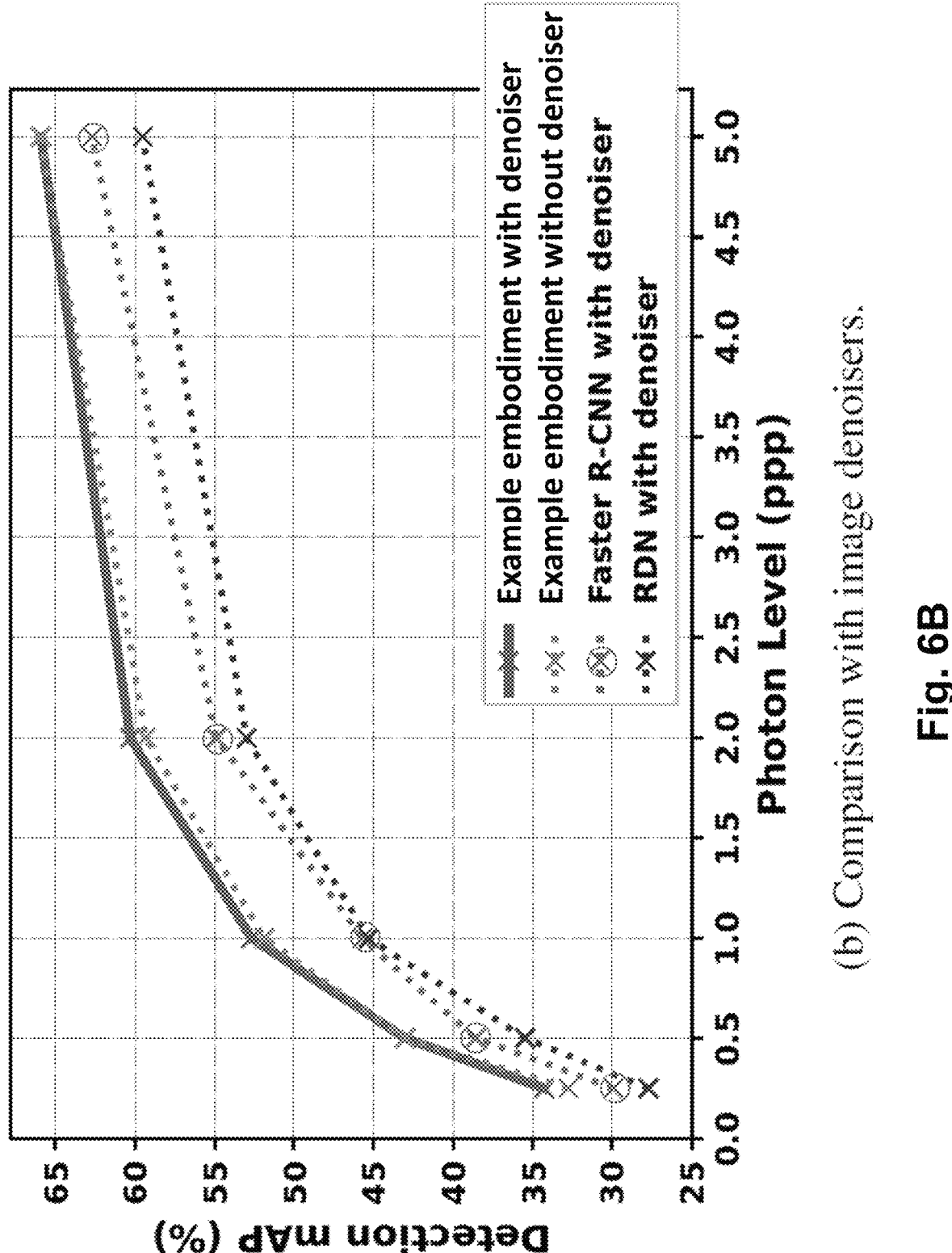
FIG. 6B depicts experimental results conducted on synthetic data comparing methods that use image denoising for pre-processing.

COMPARISON WITH IMAGE DENOISERS. When handling noisy images, existing methodologies first run a denoiser and feed the denoised images into a standard object detector. FIG. 6B depicts the comparisons with such baseline methods. One example denoiser used in embodiments used in these comparisons was the RED-Net, such as discussed in Xiaojiao Mao, Chunhua Shen, and Yu-Bin Yang. Image restoration using very deep convolutional encoder-decoder networks with symmetric skip connections. In D. Lee, M. Sugiyama, U. Luxburg, I. Guyon, and R. Garnett, editors, Advances in Neural Information Processing Systems, volume 29. Curran Associates, Inc., 2016. As the figure indicates, the proposed method outperforms the baselines by a large margin. In addition, adding a denoiser to embodiments of the present disclosure offers almost no additional benefit. Therefore, the systems and methods of this present disclosure effectively execute the denoising task without requiring another network for denoising.

ALTERNATE NETWORK DESIGNS. Table 2 demonstrates the effectiveness of the space-time non-local module 130 and the student-teacher learning module. In this table, the relative performance gain is compared with Faster R-CNN baseline. The addition of the non-local module 130 and the student-teacher training shows improvement upon the baseline. Although the performance gain shrinks when the photon level increases, this is expected since detection becomes easier. The combination of both designs shows the best performance across all photon levels, especially in extremely low light, where the relative gain is 20.07%.

TABLE 2

| Photon Level (ppp) | 0.25 | 0.5 | 1.0 | 2.0 | 3.0 |
|---|---|---|---|---|---|
| ST | 9.12 | 6.2 | 4.52 | 5.44 | 2.57 |
| NL (130) | 16.06 | 14.56 | 9.89 | 10.13 | 5.14 |
| ST + NL | 20.07 | 15.90 | 11.61 | 11.26 | 5.95 |

TABLE 2-continued

| Photon Level (ppp) | 0.25 | 0.5 | 1.0 | 2.0 | 3.0 |
|---|---|---|---|---|---|

Table 2 is a comparison of different network designs. Relative mAP increase are reported with respect to Faster RCNN baseline. The unit is %. ST is student-teacher learning; NL is non-local module 130; ST+NL is student-teacher learning+non-local module.

REAL DATA. To evaluate the performance of embodiments of the present disclosure on real data, 225 real images obtained in low light were collected and the objects from 3 categories were annotated: person, sheep, and car. Embodiments were trained using the synthetic data and the results were verified using the real data. The results of these 225 testing images are shown in Table 3. On average, the tested embodiment achieved an mAP of 87.9% while the baseline method achieves 66.9%.

TABLE 3

| | person | car | sheep | mAP (%) |
|---|---|---|---|---|
| Faster R-CNN | 54/105 | 58/60 | 60/60 | 66.9 |
| Disclosed Embodiment | 73/105 | 60/60 | 60/60 | 87.9 |

Table 3 is a comparison of detection results using real data. Each class column shows the number of correct detections versus ground truth. The last column is the overall mAP.

Figure 7:
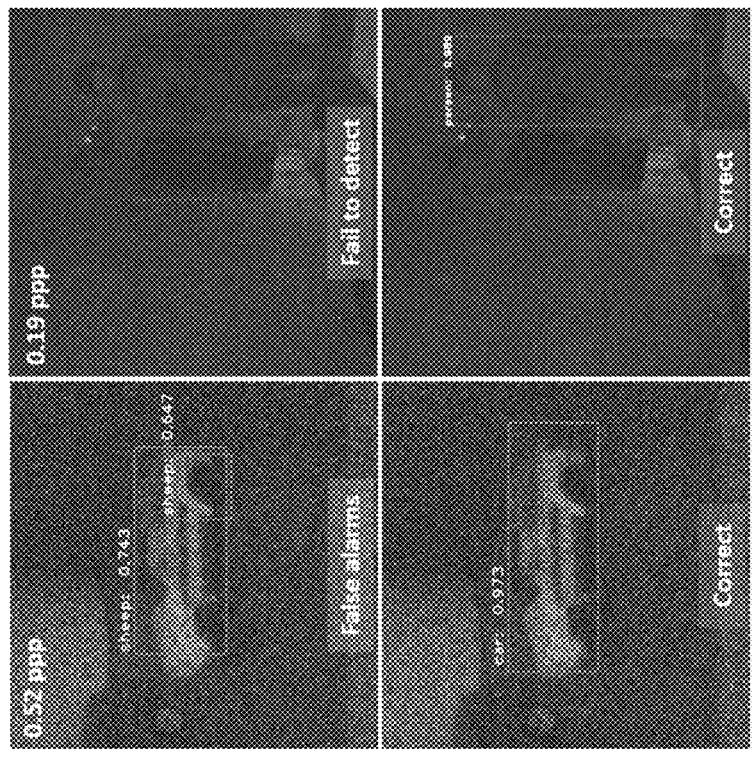
FIG. 7 depicts detection results on synthetic and real data. The top row is the Faster R-CNN baseline. The bottom row is a method according to one embodiment of the present disclosure. The photon level is shown in the top-left corner. The real data is captured by Gigajot Technology 16 MP Photon Counting Quanta Image Sensor (GJ01611).
Figure 7:
Figure 7:
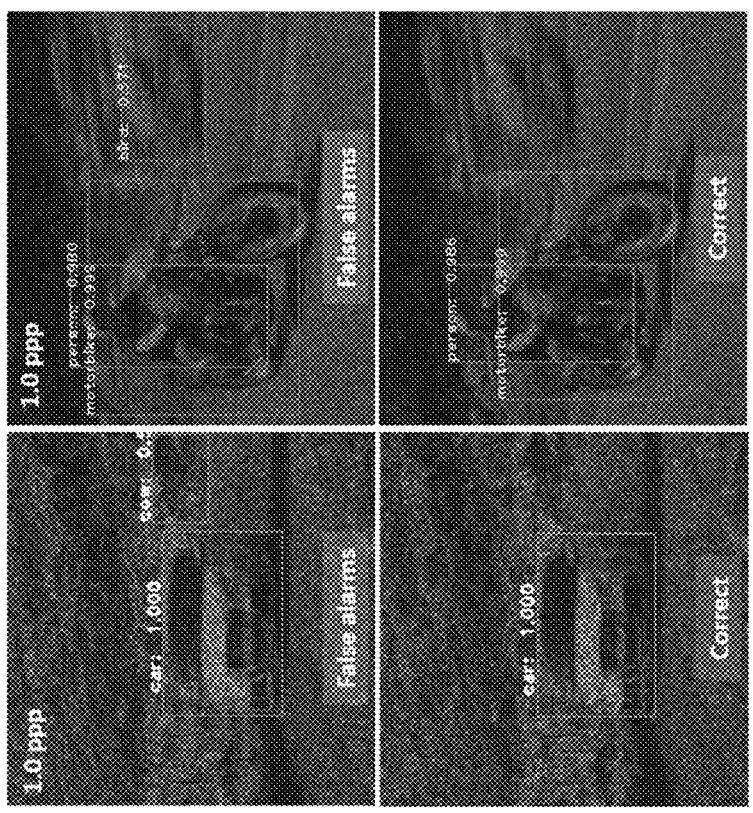

FIG. 7 is a qualitative comparison between a tested embodiment as described above and the baseline Faster R-CNN. The result shows that the baseline suffers from either false alarms or missed detection. In contrast, the tested embodiment is able to detect the static toy car and moving person on the real data when the photon level is 0.52 ppp and 0.19 ppp, respectively.

Comparison with CIS and QIS

The above described embodiments were evaluated with a conventional CMOS image sensor (CIS) from Google Pixel 3XL and a GJ01611 Quanta Image Sensor (QIS) from Gigajot Technology under different illumination levels. The algorithm of the present disclosure was combined with the CIS and QIS devices, and performance was evaluated under extremely photon-limited conditions (0.02 lux and only 0.20 ppp).

To facilitate a fair comparison, it is noted that the CIS had a pixel pitch of 1.4 $\mu$m and read noise of 2.14e$^-$, while the QIS has 1.1 $\mu$m pixels and read noise of 0.22e$^-$. In the experiments, the f-number of the lens was adjusted to balance the difference of pixel sizes (f/1.8 for CIS and f/1.4 for QIS) in the two sensors and 30 msec exposure time was used for both sensors.

Figure 8:
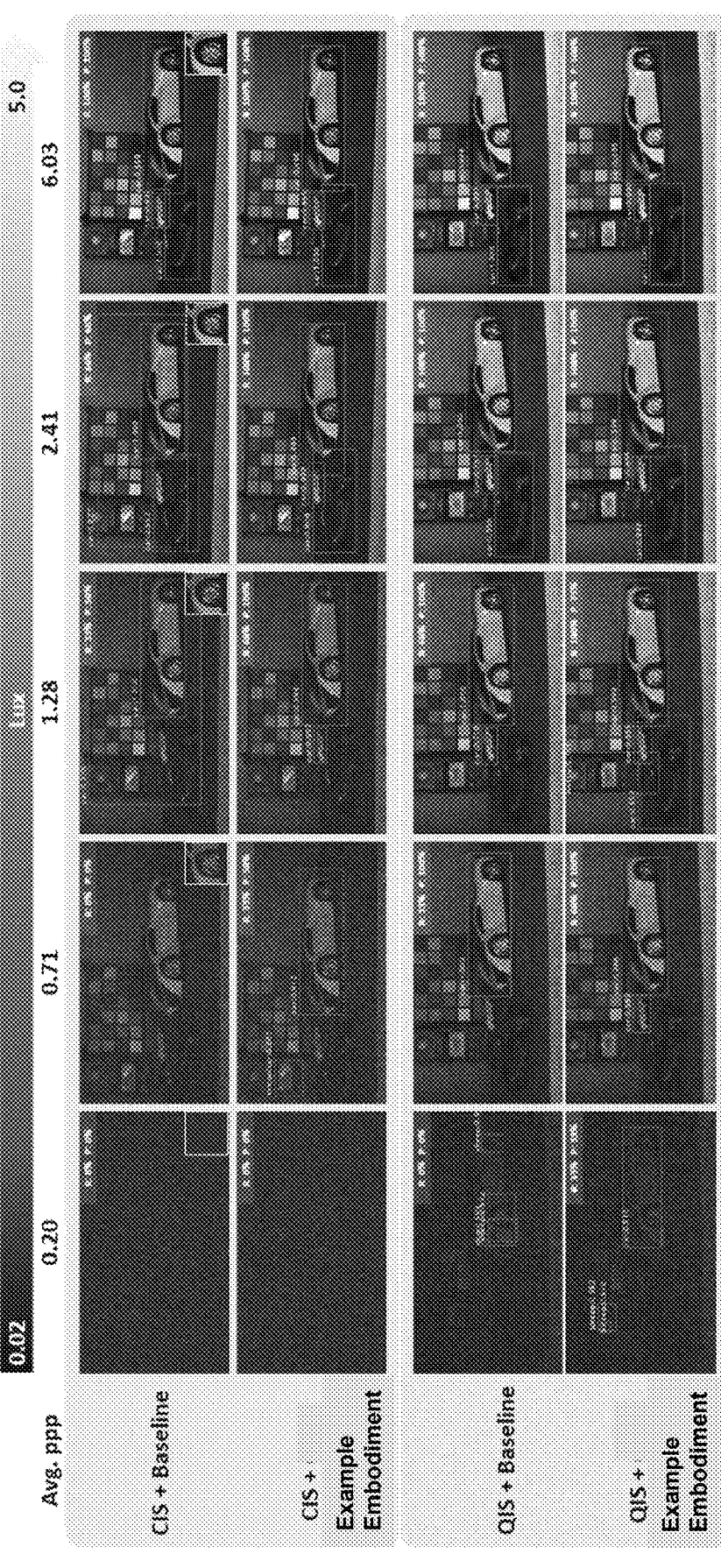
FIG. 8 is a comparison of different sensors and different detection methods using real data. The visualized figures are tone mapped and the baseline method is Faster R-CNN. Five (5) different lux levels ranging from 0.02 to 5.0 were chosen, which are equivalent to an average photons per pixel ("ppp") ranging from 0.20 to 6.03. In the right-top corner of images, the recall (R) and precision (P) are computed, enclosed in frames with different colors. Red/Yellow/Green indicates totally failed/partially correct/totally correct, respectively. The first row includes a zoomed-in view of the left-front side of the yellow car showing details in the right-bottom box. In the extremely low light condition, the images suffer from a high-noise problem.

The results of the comparison are shown in FIG. 8. The images were taken under illumination levels from 0.02 lux to 5.0 lux. Under strong illumination conditions such as 5.0 lux, all the compared methods show high detection accuracy without any false alarms. However, as the illumination level decrease, the algorithm of the present disclosure shows significant advantages over the baseline methods. This performance improvement is further enhanced with the QIS compared to the CIS because of the QIS device's ultra-low read noise. For example, under 0.02 lux and an average photon level of 0.20 ppp, only the combination of the proposed algorithm and the QIS device can successfully detect the yellow car in the scene. Because the CIS device had more read noise than the QIS device, the images generated from CIS were noisier.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

To clarify the use of and to hereby provide notice to the public, the phrases "at least one of A, B, . . . and N" or "at least one of A, B, . . . N, or combinations thereof" or "A, B, . . . and/or N" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. As one example, "A, B and/or C" indicates that all of the following are contemplated: "A alone," "B alone," "C alone," "A and B together," "A and C together," "B and C together," and "A, B and C together." If the order of the items matters, then the term "and/or" combines items that can be taken separately or together in any order. For example, "A, B and/or C" indicates that all of the following are contemplated: "A alone," "B alone," "C alone," "A and B together," "B and A together," "A and C together," "C and A together," "B and C together," "C and B together," "A, B and C together," "A, C and B together," "B, A and C together," "B, C and A together," "C, A and B together," and "C, B and A together."

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

ELEMENT NUMBERING

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 1

| 100 | Extreme low light object detection system/method |
|---|---|
| 110 | Input |
| 120 | Feature extraction module |
| 130 | Non-local module |
| 140 | Student-teacher knowledge distillation module |
| 150 | Teacher network |
| 160 | Region Proposal |
| 170 | Image formation module |
| 172 | High quality image |
| 208 | Workload monitor |
| 210 | Workload predictor |
| 212 | Workload model |
| 213 | Workload profiler |
| 214 | Static configuration tuner |
| 216 | Parameter selection logic |
| 218 | Parameter tuning logic |
| 220 | Dynamic configuration optimizer |
| 222 | performance cost/benefit logic |
| 224 | Controller |
| 312 | Communication interface |
| 314 | System circuitry |
| 316 | Processor |
| 318 | User interface |
| 320 | Memory |
| 328 | Input interface |

What is claimed is:

1. A system, comprising:
one or more processors to:
(1) train a student network using a teacher network, wherein
(1a) the teacher network defines an architecture with weights, wherein the teacher network receives clean image information,
generates results based on the clean image information, and
provides the results to a comparison module;
(1b) the student network defines an architecture with weights, wherein the student network architecture is the same as the teacher network architecture, and wherein the student network
receives noisy low light image information,
generates results based on the noisy low light image information, and
provides the results to the comparison module;
(1c) after 1a and 1b, the comparison module
receives the results from the teacher network;
receives the results from the student network;
determines the differences between the results of the teacher network and the results of the student network;
generates information for updating the student network, wherein the information for updating the student network is configured to result in large changes in the student network when the differences between the results of the teacher network and the results of the student network are large, and
small changes in the student network when the differences between the results of the teacher network and the results of the student network are small;
provides the information for updating the student network to the student network; and
(1d) after 1c, the student network
receives the information for updating the student network from the comparison module, and
modifies the weights in the student network architecture; and when a termination criterion is met, the one or more processors begin stage 2; and when the termination criterion is not met, the one or more processors repeat stage 1 with the weighs in the student network being the modified weights;

(2) analyze a plurality of low light image frames with an image extracting module, wherein an image extracting module receives one image frame of the plurality of low light image frames;

generates a feature map of the one image frame and the image frames adjacent to one image frame, each feature map including a plurality of feature vectors, calculates the inner product of each feature vector in the one image frame;

calculates the inner product of each feature vector in the frames adjacent to the one image frame;

calculates the differences between the inner products of the feature vectors in the one image frame and the feature vectors in the frames adjacent to the one image frame, selects one or more of the feature vectors with inner products that have the smallest differences between the one image frame and the adjacent image frames, generates an aggregated non-local feature vector by averaging the inner products of the selected one or more feature vectors, providing the aggregated non-local feature vectors to a user display.

2. The system of claim 1, wherein the plurality of images is a time sequence of images that, when displayed sequentially, results in a moving picture when viewed by an observer.

3. The system of claim 1, wherein each of the plurality of low light image frames includes less than 50 photons per pixel on average.

4. The system of claim 3, wherein each of the plurality of low light image frames includes less than 10 photons per pixel on average.

5. The system of claim 3, wherein each of the plurality of low light image frames includes less than 0.25 photons per pixel on average.

6. The system of claim 1, wherein the clean image information includes an image with greater than 50 photons per pixel on average.

7. The system of claim 1, wherein the teacher network is trained using clean image information and synthesized photon-limited information, wherein the synthesized photon-limited information is generated from the clean image information.

8. The system of claim 7, wherein the clean image information is modeled through a Poisson process utilizing $$x = \text{Poisson}(\alpha \cdot \text{CFA}(y_{RGB}) + \eta_{dc}) + \eta_r$$

wherein $\alpha$ is from 0.25 to 5.0, $\eta_{dc}$ is zero, and $\sigma_r$ is from 0.25 to 2.0.

9. The system of claim 1, wherein the termination criterion is a predetermined number of iterative training steps.

10. The system of claim 1, wherein the termination criterion is whether the differences between the results of the student and teacher networks are less than a predetermined level.

11. A non-transitory computer-readable medium storing instructions, the instructions, comprising one or more instructions that, when executed by one or more processors, cause the one or more processors to:

(1) train a student network using a teacher network, wherein (1a) the teacher network defines an architecture with weights, wherein the teacher network receives clean image information, generates results based on the clean image information, and provides the results to a comparison module;

(1b) the student network defines an architecture with weights, wherein the student network architecture is the same as the teacher network architecture, and wherein the student network receives noisy low light image information, generates results based on the noisy low light image information, and provides the results to the comparison module;

(1c) after 1a and 1b, the comparison module receives the results from the teacher network, receives the results from the student network, and determines the differences between the results of the teacher network and the results of the student network;

when a termination criterion is met, the one or more processors begin stage 2; and when the termination criterion is not met, the comparison module generates information for updating the student network, and provides the information for updating the student network to the student network; and the student network receives the information for updating the student network from the comparison module, and modifies the weights in the student network architecture; and the one or more processors repeat stage 1 with the weighs in the student network being the modified weights;

(2) analyze a plurality of low light image frames with an image extracting module, wherein an image extracting module receives one image frame of the plurality of low light image frames;

generates a feature map of the one image frame and the image frames adjacent to one image frame, each feature map including a plurality of feature vectors, calculates the inner product of each feature vector in the one image frame;

calculates the inner product of each feature vector in the frames adjacent to the one image frame;

calculates the differences between the inner products of the feature vectors in the one image frame and the feature vectors in the frames adjacent to the one image frame, selects one or more of the feature vectors with inner products that have the smallest differences between the one image frame and the adjacent image frames, generates an aggregated non-local feature vector by averaging the inner products of the selected one or more feature vectors, providing the aggregated non-local feature vectors to a user display.

12. The non-transitory computer-readable medium of claim 11, wherein the plurality of images is a time sequence of images that, when displayed sequentially, results in a moving picture when viewed by an observer.

13. The non-transitory computer-readable medium of claim 11, wherein each of the plurality of low light image frames includes less than 50 photons per pixel on average.

14. The non-transitory computer-readable medium of claim 13, wherein each of the plurality of low light image frames includes less than 10 photons per pixel on average.

15. The non-transitory computer-readable medium of claim 13, wherein each of the plurality of low light image frames includes less than 0.25 photons per pixel on average.

16. The non-transitory computer-readable medium of claim 11, wherein the clean image information includes an image with greater than 50 photons per pixel on average.

17. The non-transitory computer-readable medium of claim 11, wherein the teacher network is trained using clean image information and synthesized photon-limited information, wherein the synthesized photon-limited information is generated from the clean image information.

18. The non-transitory computer-readable medium of claim 17, wherein the clean image information is modeled through a Poisson process utilizing $$x = \text{Poisson}(\alpha \cdot \text{CFA}(y_{RGB}) + \eta_{dc}) + \eta_r$$

wherein $\alpha$ is from 0.25 to 5.0, $\eta_{dc}$ is zero, and $\sigma_r$ is from 0.25 to 2.0.

19. The non-transitory computer-readable medium of claim 11, wherein the termination criterion is a predetermined number of iterative training steps.

20. The non-transitory computer-readable medium of claim 11, wherein the termination criterion is whether the differences between the results of the student and teacher networks are less than a predetermined level.

* * * * *